G. F. MURDOCK.
NUT LOCK.
APPLICATION FILED MAR. 7, 1911.
995,169.
Patented June 13, 1911.
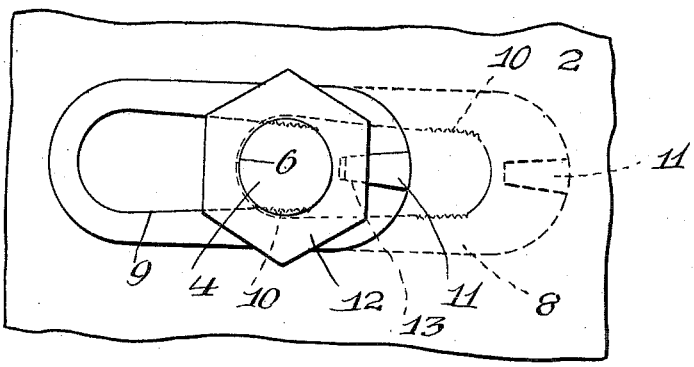
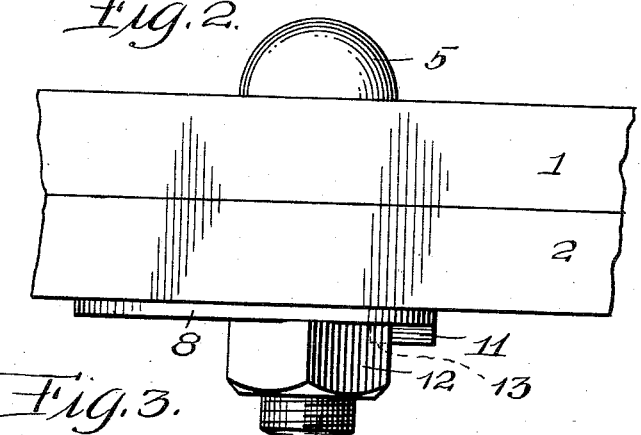
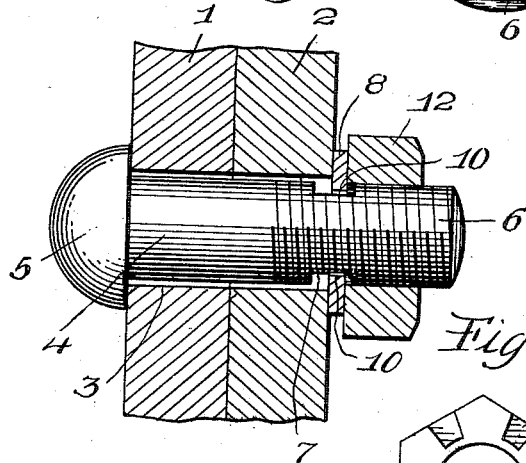
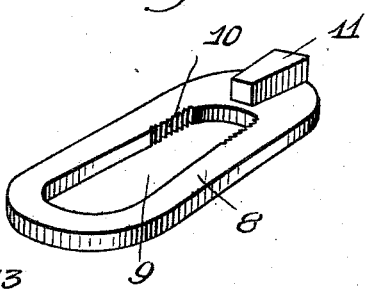
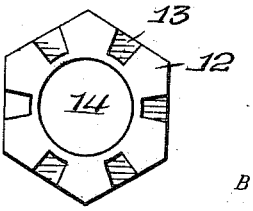
WITNESSES:
INVENTOR.
G. F. Murdock.
BY
ATTORNEYS.

UNITED STATES PATENT OFFICE.

GEORGE F. MURDOCK, OF WELLSVILLE, OHIO.

NUT-LOCK.

995,169.  Specification of Letters Patent.  Patented June 13, 1911.

Application filed March 7, 1911. Serial No. 612,906.

*To all whom it may concern:*

Be it known that I, GEORGE F. MURDOCK, a citizen of the United States of America, residing at Wellsville, in the county of Columbiana and State of Ohio, have invented certain new and useful Improvements in Nut-Locks, of which the following is a specification, reference being had therein to the accompanying drawing.

This invention relates to nut locks, and the objects of my invention are to provide a nut locking device that can be advantageously used in connection with rail joints, bridges, rolling stock and structures subjected to vibrations that have a tendency to displace nuts, and to provide a nut locking device that is positive in its action, free from injury by ordinary use and highly efficient for the purposes for which it is intended.

I attain the above objects by a mechanical construction that will be hereinafter specifically described and then claimed, and reference will now be had to the drawing, wherein like numerals of reference designate corresponding parts throughout the several views, in which:—

Figure 1 is a front elevation of the nut lock, showing the nut locking device in an unlocked position by dotted lines, Fig. 2 is a plan of the nut lock, Fig. 3 is a longitudinal sectional view of the same, Fig. 4 is a perspective view of a detached locking device, and Fig. 5 is an elevation of the inner face of a nut in accordance with this invention.

The reference numerals 1 and 2 denote, by the way of an example, two pieces of material having registering openings 3 for a bolt 4 having a head 5 engaging the outer side of the piece of material 1 and the threaded end 6 protruding from the outer side of the piece of material 2. The bolt 4 is provided with oppositely disposed transverse grooves 7 and arranged upon said bolt and engaging the outer side of the piece of material 2 is a nut locking member 8 having an oblong opening 9 gradually tapering from one end of the member 8 to within proximity to the opposite end, the upper and lower walls of the opening 9 at the small end thereof being roughened or provided with transverse teeth or serrations 10. The outer side of the member 8 is provided with a lug 11 wedge-shaped throughout and preferably formed integral with the front side of said member, the lug being of a length as to extend from the outer edge of the member to the inner edge or small end of the opening 9, said lug gradually decreasing in width from its outer to its inner end.

Screwed upon the threaded end 6 of the bolt 4 is a nut 12 square, hexagonal or octagonal in shape with the inner face thereof provided with a series of grooves 13 disposed at right angles with respect to the wall of the opening 14 of said nut, each of said grooves tapering throughout with the large ends of said grooves at the facets of the nut.

The large end of the opening 9 of the member 8 permits of the member being placed upon the bolt in engagement with the piece of material 2, and after the nut 12 has been screwed thereon, the member 8 is shifted between the piece of material 2 and the nut 12 until the teeth or serrations 10 engage the bottoms of the grooves 7. The end of the member can then be struck a blow that will drive the lug 11 into one of the grooves 13 and at the same time cause the teeth 10 to frictionally grip the bottom surface of the grooves 7, said teeth preventing the vibrations to which the nut lock is subjected from jarring the member 8 to that extent as to loosen the same, particularly when the nut locking device is in a horizontal position as shown in Fig. 1.

The lug 11 and recesses 13 not only coöperate to prevent rotation of the nut on the washer, but also to set up an intense frictional engagement between the washer and the nut.

I attach considerable importance to the detail construction of the nut locking device, especially the shape of the opening 9 and the teeth carried by the walls of said opening.

What I claim is:—

In a nut lock, the combination with a bolt having the threaded end thereof provided with oppositely disposed transverse grooves, a locking member movably mounted upon said bolt and having an oblong tapering opening formed therein with the walls of said opening at the small end thereof provided with teeth adapted to engage the bottom surfaces of said groove and prevent accidental displacement of said member relatively to said bolt, a lug wedge-shaped throughout formed integral with said member at the front side thereof and of a length as to extend from the outer to the inner edge of said member, said lug gradually decreasing in width from its outer to its inner end, and a nut adapted to screw upon said bolt and having its inner face provided with a series of grooves disposed at right angles with respect to the wall of the opening of the nut, each of said grooves tapering throughout and adapted to snugly receive the wedge shaped lug of the locking member whereby the nut will be prevented from turning upon the bolt.

In testimony whereof I affix my signature in the presence of two witnesses.

GEORGE F. MURDOCK.

Witnesses:
M. E. IMBRIE,
W. R. MACDONALD.

Copies of this patent may be obtained for five cents each, by addressing the "Commissioner of Patents, Washington, D. C."